(12) United States Patent
Zamzow et al.

(10) Patent No.: US 7,390,972 B2
(45) Date of Patent: Jun. 24, 2008

(54) ELECTRICAL CABLE FOR A LINEAR MOTOR AND WINDING PRODUCED FROM IT

(76) Inventors: Peter Zamzow, Erlenstasse 5b, D-44795 Bochum (DE); Harald Büthe, Ritzbruch 65, D-41334 Nettetal (DE); Georg Talian, Claudiusstrasse 10, D-47441 Moers (DE)

( * ) Notice: Subject to any disclaimer, the term of this patent is extended or adjusted under 35 U.S.C. 154(b) by 147 days.

(21) Appl. No.: 11/452,190

(22) Filed: Jul. 14, 2006

(65) Prior Publication Data

US 2007/0017690 A1 Jan. 25, 2007

Related U.S. Application Data

(62) Division of application No. 11/122,985, filed on May 4, 2005, now abandoned.

(51) Int. Cl.
*H01B 7/00* (2006.01)
(52) U.S. Cl. .................................... 174/120 SC
(58) Field of Classification Search ........... 174/120 SC, 174/106 R
See application file for complete search history.

(56) References Cited

U.S. PATENT DOCUMENTS

| 3,935,042 | A | * | 1/1976 | Wahl | 156/56 |
| 4,197,423 | A | * | 4/1980 | Fusen | 174/107 |
| 5,036,165 | A | * | 7/1991 | Elton et al. | 174/102 SC |

* cited by examiner

*Primary Examiner*—Chau N Nguyen
(74) *Attorney, Agent, or Firm*—Sofer & Haroun, LLP

(57) ABSTRACT

A winding for a linear motor, which winding has three electrical cables arranged in grooves of an elongated inductor. The three electrical cables have an electrically conductive sheath and an electrically conductive intermediate layer arranged between the sheath and an outer conductive layer. At least one metal strand of an electrically highly conductive material that has electrically highly conductive contact with the conductive sheath of the cables and serves as a grounding conductor is present over the whole length of a stator. The stator includes the inductor and the three cables, which are connected to form a three-phase winding. The intermediate layer is formed from nonwoven material that has a thickness of about 300 μm-600 μm and an electrical resistance of about 150 Ω/m-500 Ω/m. The value of the electrical resistance of the intermediate layer is greater than the corresponding resistance value of the strand used as the grounding conductor.

12 Claims, 2 Drawing Sheets

ELECTRICAL CABLE FOR A LINEAR MOTOR AND WINDING PRODUCED FROM IT

RELATED APPLICATIONS

This application is a divisional of U.S. patent application Ser. No. 11/122,985, filed May 4, 2005 now abandoned which is related to and claims the benefit of priority from European Patent Application No. 04291 779.9, filed on Jul. 12, 2004, the entirety of which is incorporated herein by reference.

FIELD OF THE INVENTION

The invention concerns a three-phase winding produced with an electrical cable for a linear motor.

BACKGROUND OF THE INVENTION

The electrical cable consists of an electrically highly conductive metallic conductor, an inner conductive layer that surrounds the metallic conductor, an insulating layer arranged above the inner conductive layer, an outer conductive layer that surrounds the insulation, a sheath made of insulating material, which has been rendered electrically conductive, arranged above the outer conductive layer, and an electrically conductive intermediate layer arranged between the outer conductive layer and the sheath (DE 19638603 AI).

Linear motors have long been known for electric drives of various types. In this regard, there are both direct-current and alternating-current synchronous and asynchronous motors. In contrast to a conventional motor, in a linear motor, both a stationary stator and a moving rotor are arranged linearly rather than circularly. The electrical energy is converted to mechanical energy in a linear motor in such a way that it can be used directly for a translational motion. Fields of application for linear motors are passenger vehicles, conveyance and transportation, conveyor lines, luggage conveyance, mining, cranes, towing equipment, machine tool carriages, and the operation of valves. In principle, the linear motor can have a field winding that is arranged in grooves of an inductor and can have a three-phase design in the case of alternating current. The rotor portion then consists either of a rail of an electrically highly conductive material, such as copper or aluminum (asynchronous motor), or of permanently magnetic material (synchronous motor).

If a linear motor of this type is used, for example, to drive a high-speed long-distance maglev train, the inductor and thus the cable installed in its grooves are then very long. Since for this reason a linear motor of this type is operated at a relatively high voltage, the cable must be equipped with an inner and an outer conductive layer as well as a shield. The shield of medium-voltage cables of this type is necessary for safely carrying capacitive charging currents, for ground fault detection, for allowing the possibility of fault location, and as protection against mechanical damage to the layers surrounding the conductor. In addition, it is intended to protect living beings from being endangered by high voltages.

When medium-voltage cables with the structure described above are used in the very long stator (consisting of the inductor and cables) of a linear motor, a high longitudinal voltage is induced in the shields of the cable, which can amount to well over 1 kV for a stator 100 m long. To prevent such high voltages from arising, the shields could be divided into very short segments, and each segment could be single-ended, i.e., grounded on one side. This is complicated and expensive and increases the risk of cable faults. With previously known shielded medium-voltage cables, low shield voltages could also be achieved by the grounding of the shields on both ends of a segment of almost any length or by connection of the shields of the three cables used for the winding in almost any intervals. However, large shield currents would then flow, which would cause large energy losses and would act as an eddy-current brake.

DE 30 06 382 A1 describes a three-phase alternating-current winding for a linear motor that consists of medium-voltage electrical cables with the structure described above. The cables used here have an outer sheath that consists of an insulating material that has been rendered conductive. On at least one side of the stator, a strand of an electrically highly conductive material is arranged in the area of the winding heads that extend out of the grooves. This strand extends the whole length of the stator, is in good contact with the conductive sheaths of the cables, and can be connected to ground potential. The electrically conductive sheaths of the cables simultaneously constitute their shield, which has a relatively low electrical conductivity. The combination of the sheaths with the strand connected to ground potential results all together in a shield that guarantees good diversion of capacitive currents and also ensures that currents arising as a result of induced voltages remain small. All together, the winding thus has low dissipation, and the influence on the field becomes negligible. Moreover, since high voltages cannot arise, endangerment of living beings is avoided.

In the previously known cable described in DE 196 38 603 A1, which was cited above, a metal mesh is present as an intermediate layer that is closed all around and extends the whole length of the cable between the outer conductive layer and the sheath, which has been rendered electrically conductive. This intermediate metal mesh increases the electrical conductivity of the shield of the cable. The purpose of this is to minimize electric voltages and currents that are induced in the shield and could diminish the driving power of the linear motor. In addition, the metal mesh is intended to make the axial resistance along the axis of the cable homogeneous and to ensure the detection of a ground fault and the drainage of fault currents more easily and to a sufficient extent. Indeed, this is achieved with this previously known cable in many applications. Nevertheless, it can happen that the cable is damaged, especially at elevated operating voltage.

OBJECTS AND SUMMARY OF THE INVENTION

The objective of the invention is to design the cable described at the beginning and the winding produced from it in such a way that it can be adapted in a simple way to different operating voltages, so that damage due to operating voltages that are too high can be prevented. In accordance with the invention, the objective with respect to the cable is achieved with the use of a nonwoven material as the intermediate layer, which has a thickness of 300-600 μm and an electrical resistance of about 150-500 Ω/m.

With respect to the three-phase winding, the invention ensures that the resistance value of the intermediate layer is greater than the corresponding resistance value of a grounding conductor fitted on the sheaths of the cables.

In this cable, the electrical resistance of the shield can be adapted in a simple way to the given requirements. The structure of the cable, the method for manufacturing it, and the facilities used for this purpose can remain unchanged. The nonwoven material increases the conductivity of the shield of the cable to such an extent that the shield can carry sufficiently high currents to ensure simple and fast detection of a ground fault. The nonwoven material can consist of graphite fibers alone or in combination with synthetic fibers. The resistance value of the shield remains sufficiently high with the use of the nonwoven material that low-resistance secondary circuits that result in high losses do not arise. Losses due to voltages and currents induced in the shield of the cable are negligible compared to other line losses. The resistance value of the nonwoven material is adjusted in each case in such a way that it is sufficiently high for the intended use of the cable. If the stator of the linear motor in which the cable is used for the three winding strands contains a separate grounding conductor that is in good contact with the conductive sheaths of all three cables, then the resistance value of the strip of an electrically conductive nonwoven material is adjusted higher than the resistance value of a metal strand used as a grounding conductor. Then, regardless of the operating voltage used for the linear motor, fault currents and transient currents are safely diverted by the grounding conductor. In this way, the cable and especially its outer sheath are effectively protected from damage by excessively high currents. This is also the case with large temperature differences to which the cables are exposed during operation during the day and night and at different times of the year. Even then, the strip retains the resistance value it was given during its manufacture with great accuracy.

The nonwoven material of the intermediate layer is joined relatively strongly with the sheath during the extrusion of the sheath. This produces the additional advantage of simplified installation when the layers of the cable arranged above the outer conductive layer must be removed for connection purposes.

BRIEF DESCRIPTION OF THE DRAWINGS

Specific embodiments of the object of the invention are illustrated in the drawings.

DETAILED DESCRIPTION

Figure 1:
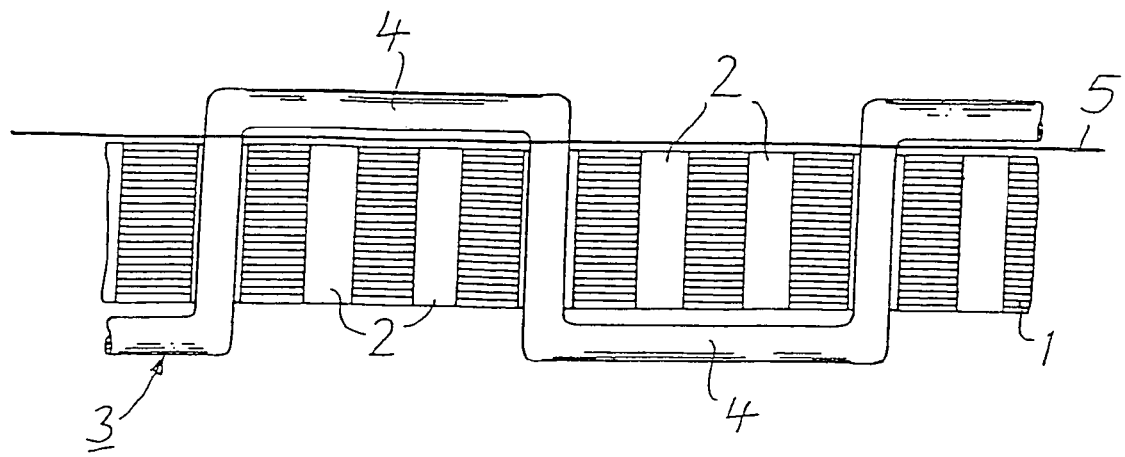
FIG. 1 shows a cable of the invention bent into a meandering winding strand.
Figure 2:
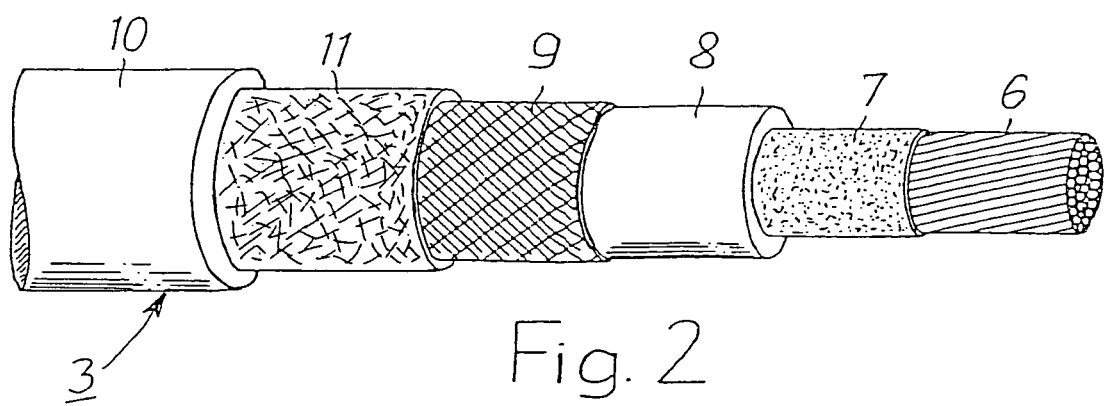
FIG. 2 shows the cable itself with layers of its structure visible in sections.

FIG. 1 shows a linear motor inductor 1, which, together with a three-phase winding, forms the stator of the motor. The inductor 1 consists of laminated cores, in which grooves 2 are placed for holding winding strands of the winding. The stator is elongated. It can be many kilometers long. In the present case, the winding strands consist of electrical cables, whose exact structure is apparent, for example, from FIG. 2.

FIG. 1 shows a cable 3, which is installed with a meandering course in the grooves 2 of the inductor 1. The unoccupied grooves 2 of the inductor 1 are provided for holding two additional cables with the same structure as cable 3. For the sake of simplicity, they are not shown in the drawing. The three cables together form the three-phase winding of the linear motor. The cable 3 is constructed in such a way that it can easily be deformed into its meandering course and retains its shape without additional work even in the areas in which it is outside the inductor 1, i.e., the winding heads 4. On at least one side of the inductor 1, a metal strand 5 made of an electrically highly conductive material can run along the whole length of the inductor 1 and serves as a grounding conductor. It is in good electrical contact with the cables and can be connected to ground potential in the installed position.

The cable 3 and the other two cables have, for example, the following structure.

The conductor of the cable 3 is constructed as a stranded conductor 6, which consists of a large number of individual wires. At least two courses of individual wires are present. The direction of twist of the stranding in these two courses should be opposite each other. If there are more than two courses, the courses should have alternately opposite directions of twist. The stranded conductor 6 can consist of aluminum wires. However, it is also possible to use copper wires or wires made of an aluminum-copper composite.

The stranded conductor 6 is surrounded by an inner conductive layer 7, which can be extruded on the stranded conductor. In this regard, the extrusion process is coordinated in such a way that the material of the conductive layer 7 also penetrates the wedge-shaped spaces between the individual wires of the outer course of the stranded conductor 6. The conductive layer 7 is permanently joined with the conductor 6 in this way, since it is firmly anchored on it. The fit is so tight that the conductive layer 7 does not become detached from the stranded conductor 6 either by bending or by axial stress. A material synthesized on the basis of EPDM (ethylene-propylene-diene monomer) is preferably used for the inner conductive layer 7. This is a material based on a copolymer of ethylene and propylene. Highly active conductive carbon blacks are added to the base material. This can be a single conductive carbon black. Several conductive carbon blacks can also be used in the blend.

The inner conductive layer 7 is surrounded by an insulating layer 8, which can also be applied by extrusion in the same operation as the conductive layer 7. The insulating layer 8 consists, for example, of a mixture based on EPR (ethylene-propylene rubber). An outer conductive layer 9 can also be extruded on the insulating layer 8 in the same operation. The same material used for the inner conductive layer 7 can be used here. The anchoring of the inner conductive layer 7 on the stranded conductor 6 results in such a tight overall fit of the layers 7, 8 and 9, which are firmly joined with one another, on the stranded conductor 6 that these layers are immovable even when fittings are mounted.

The cable 3 has an outer sheath 10, which consists of a plastic that has been rendered conductive. It is also applied by extrusion. Examples of suitable materials for the sheath 10 are polymers based on acetate copolymers of ethylene, which have an acetate content of, for example, 30-70%. Highly conductive carbon blacks are added to these polymers. A combination of at least two carbon blacks is preferred.

An electrically conductive intermediate layer 11 is arranged between the outer conductive layer 9 and the conductive sheath 10. It has an electrical resistance of about 150-500 Wm. The intermediate layer 11 consists of a strip H (FIGS. 3 to 8) of an electrically conductive nonwoven material. The nonwoven material can consist solely of graphite fibers, of graphitized synthetic fibers, or of a combination of such fibers with synthetic fibers. Its electrical resistance can be adjusted in this way to the desired or required value for a given application. To form the intermediate layer 11, the strip H can either be wound around the outer conductive layer 9 or formed around the outer conductive layer 9 in the longitudinal direction, as shown in FIGS. 3 to 8.

Figure 3:
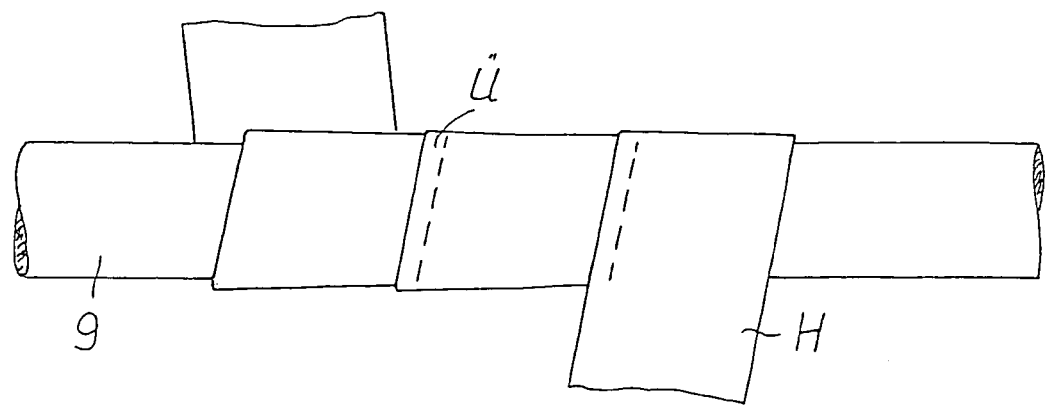
FIGS. 3 to 8 show different configurations of a nonwoven material present as an intermediate layer in the cable structure.

In FIG. 3, the strip H is wound around the outer conductive layer 9 of the cable 3 in such a way that its edges overlap each other. The overlap 0 can be, for example, 2-8 mm. The strip H itself can be a wrapping strip 10-80 mm wide.

Figure 4:
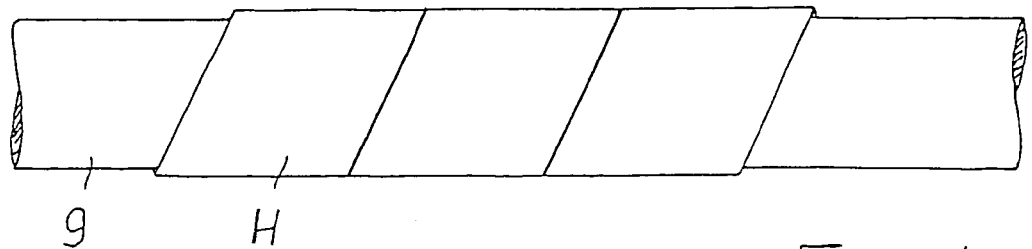

As shown in FIG. 4, the strip H can also be wound around the outer conductive layer 9 in such a way that its edges abut on each other. This results in a nonoverlapping intermediate layer 11 that is closed all around and in the longitudinal direction.

Figure 5:
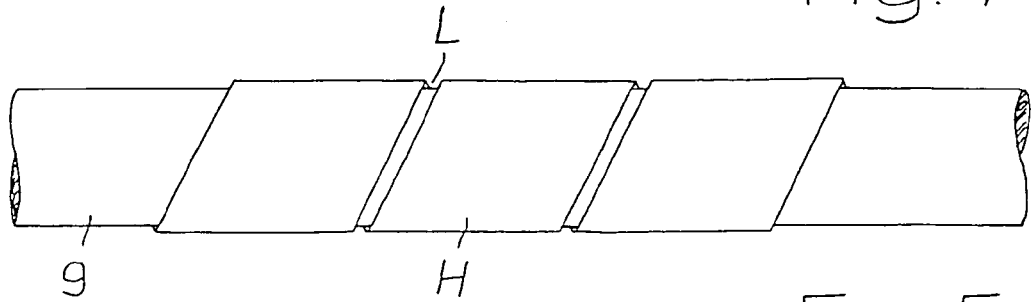
Figure 6:
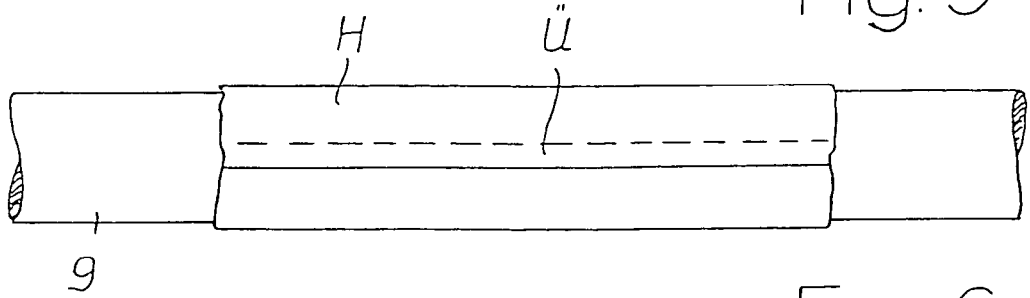
Figure 7:
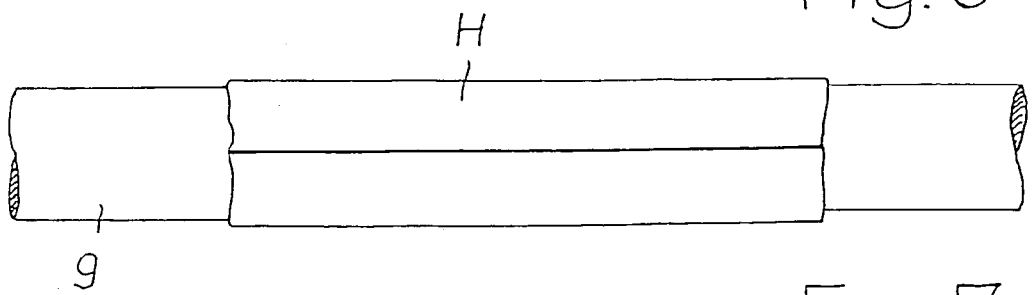

In another possibility for forming the intermediate layer 11, the strip H is wound around the outer conductive layer 9 with gaps L between its edges, as shown in FIG. 5.

Figure 8:
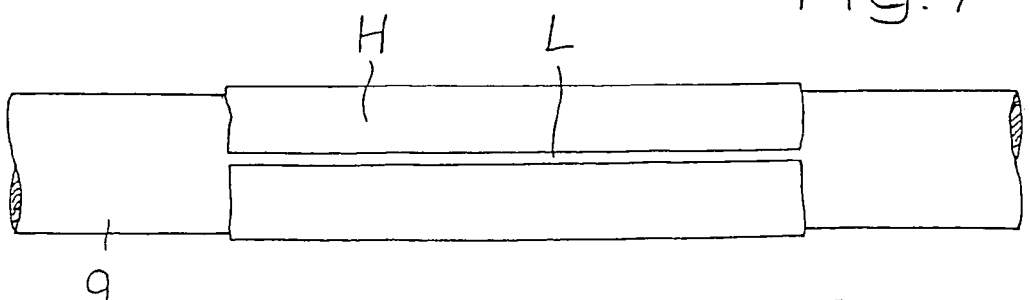

The same situation results when the strip H is wrapped around the outer conductive layer 9 of the cable 3 in the longitudinal direction with overlapping edges (overlap Ü) that run longitudinally (FIG. 6), with abutting edges (FIG. 7), or with a gap L between the edges (FIG. 8). A wider strip H with a width of 80-150 mm can be used for this longitudinal configuration. The diameter of the given cable above the outer conductive layer 9 is an essential consideration here.

The cable is used with special advantage in the stator of a linear motor in which there is at least one metal strand 5 that is made of an electrically highly conductive material and serves as the grounding conductor. The strand 5 has electrically highly conductive contact with the conductive sheaths 10 of the three cables present in the stator. Strong currents that arise, for example, by induction are usually carried away by the grounded strand 5. This is guaranteed with the present cable in any case, since the value per unit length of the electrical resistance of the strip H used as the intermediate layer 11 is at least slightly higher than the corresponding resistance value of the strand 5.

The invention claimed is:

1. A winding for a linear motor, said winding comprising: three electrical cables arranged in grooves of an elongated inductor, wherein the three electrical cables each have an electrically conductive sheath and an electrically conductive intermediate layer arranged between the sheath and an outer conductive layer, and wherein at least one metal strand of an electrically highly conductive material that has electrically highly conductive contact with the conductive sheath of the cables and serves as a grounding conductor is present over the whole length of a stator, which comprises the inductor and the three cables, which are connected to form a three-phase winding, wherein the intermediate layer is formed from nonwoven material that has a thickness of about 300 μm-600 μm and an electrical resistance of about 150 Ω/m-500 Ω/m;

and wherein the value of the electrical resistance of the intermediate layer is greater than the corresponding resistance value of the strand used as the grounding conductor.

2. The winding in accordance with claim 1, wherein the nonwoven material is formed from graphite fibers.

3. The winding in accordance with claim 1, wherein the nonwoven material is formed from graphitized synthetic fibers.

4. The winding in accordance with claim 1, wherein the nonwoven material is formed from a combination of graphite fibers or graphitized synthetic fibers and synthetic fibers.

5. The winding in accordance with claim 1, wherein the nonwoven material is wound as a strip around the outer conductive layer.

6. The winding in accordance with claim 5, wherein the strip is wound with overlapping edges.

7. The winding in accordance with claim 5, wherein the strip is wound with abutting edges.

8. The winding in accordance with claim 5, wherein the strip is wound with gaps.

9. The winding in accordance with claim 1, wherein the nonwoven material is formed around the outer conductive layer in the longitudinal direction.

10. The winding in accordance with claim 9, wherein the strip is formed with an overlap.

11. The winding in accordance with claim 9, wherein the strip is formed with abutting edges.

12. The winding in accordance with claim 9, wherein the strip is formed with a gap between the longitudinal edges.

* * * * *